United States Patent
Takahashi et al.

(10) Patent No.: US 12,003,165 B2
(45) Date of Patent: Jun. 4, 2024

(54) MOTOR CASE

(71) Applicant: Hitachi Astemo, Ltd., Hitachinaka (JP)

(72) Inventors: Toshiki Takahashi, Ibaraki (JP);
Takuya Miyagi, Ibaraki (JP); Hayato Fujita, Ibaraki (JP); Yuichiro Baba, Ibaraki (JP)

(73) Assignee: Hitachi Astemo, Ltd, Hitachinaka (JP)

( * ) Notice: Subject to any disclaimer, the term of this patent is extended or adjusted under 35 U.S.C. 154(b) by 467 days.

(21) Appl. No.: 17/293,144

(22) PCT Filed: Dec. 13, 2019

(86) PCT No.: PCT/JP2019/048884
§ 371 (c)(1),
(2) Date: May 12, 2021

(87) PCT Pub. No.: WO2020/145034
PCT Pub. Date: Jul. 16, 2020

(65) Prior Publication Data
US 2022/0352786 A1     Nov. 3, 2022

(30) Foreign Application Priority Data
Jan. 8, 2019     (JP) .................. 2019-001346

(51) Int. Cl.
H02K 5/24     (2006.01)
(52) U.S. Cl.
CPC ........... H02K 5/24 (2013.01); *H02K 2213/03* (2013.01)
(58) Field of Classification Search
CPC ................... H02K 5/24; H02K 5/18
See application file for complete search history.

(56) References Cited

U.S. PATENT DOCUMENTS 5,630,461 A * 5/1997 CoChimin ............... H02K 5/18
164/45
6,963,153 B1 * 11/2005 Su ........................... H02K 5/18
310/91

(Continued)

FOREIGN PATENT DOCUMENTS

DE    102012023050 A1 * 5/2014 ............. H02K 15/14
DE    102012023050 A1    5/2014
(Continued)

OTHER PUBLICATIONS

International Search Report with English translation and Written Opinion issued in corresponding application No. PCT/JP2019/048884 dated Mar. 17, 2020.

(Continued)

*Primary Examiner* — Robert W Horn
(74) *Attorney, Agent, or Firm* — Foley & Lardner LLP

(57) ABSTRACT

An object of the present invention is to promote weight reduction while improving torsional stiffness of a motor case of a rotary electric machine. A motor case accommodates a stator, a rotor facing an inner periphery of the stator, and a rotating shaft coupled to the rotor. The motor case includes a peripheral wall which is formed in a tubular shape and has a space accommodating the stator and the rotating shaft on an inside, a flange portion which is formed at one end of the peripheral wall and is coupled to an outside, and damping ribs which are formed at an outer periphery of the peripheral wall, are formed between a position crossing the outer periphery of the peripheral wall and the flange portion on an extension of the rotating shaft in a radial direction from an end portion of the stator, and are constituted by a plurality of ribs.

2 Claims, 3 Drawing Sheets

(56) References Cited

U.S. PATENT DOCUMENTS

| | | | | |
|---|---|---|---|---|
| 2013/0115118 A1* | 5/2013 | Chien | ................ | F04D 13/0633 |
| | | | | 417/420 |
| 2016/0329760 A1* | 11/2016 | Major | .................... | H02K 15/12 |
| 2022/0352786 A1* | 11/2022 | Takahashi | ................ | H02K 5/06 |

FOREIGN PATENT DOCUMENTS

| | | | |
|---|---|---|---|
| JP | 2000-060059 A | 2/2000 | |
| JP | 2009-232601 A | 10/2009 | |
| JP | 2009-232658 A | 10/2009 | |
| JP | 2017-070120 A | 4/2017 | |
| JP | 6364444 B2 | 7/2018 | |
| WO | WO-2006108550 A1 * | 10/2006 | ........... F04D 29/626 |

OTHER PUBLICATIONS

Extended European Search Report for counterpart European Patent Application EP 19908848.5-1202 dated Apr. 19, 2022 (8 pages).

* cited by examiner

MOTOR CASE

TECHNICAL FIELD

The present invention relates to a motor case of a rotary electric machine.

BACKGROUND ART

In addition to strength, weight reduction is also required for a motor case of a rotary electric machine mounted on a vehicle. A technology for forming ribs at an outer periphery of the motor case is known in order to secure the strength and reduce the weight (for example, PTL 1).

CITATION LIST

Patent Literature

PTL 1: JP 2009-232601 A

SUMMARY OF INVENTION

Technical Problem

In a rotary electric machine for driving, since torque generated is large and an electromagnetic excitation force generated is also large, it is necessary to increase stiffness in torsion of the motor case. However, in the above-mentioned related art, it is not possible to achieve both the weight reduction and securing of torsional stiffness of the motor case.

When the stiffness in torsion cannot be secured, since vibration due to the electromagnetic excitation force is generated in the motor case and vibration or noise increases particularly in a low rotation range, there is a problem that the quietness of the vehicle is impaired.

Thus, the present invention has been made in view of the above problems, and an object of the present invention is to promote weight reduction while improving torsional stiffness of a motor case of a rotary electric machine.

Solution to Problem

The present invention provides a motor case that accommodates a stator, a rotor facing an inner periphery of the stator, and a rotating shaft coupled to the rotor. The motor case includes a peripheral wall which is formed in a tubular shape and has a space accommodating the stator and the rotating shaft on an inside, a flange portion which is formed at one end of the peripheral wall and is coupled to an outside, and damping ribs which are formed at an outer periphery of the peripheral wall, are formed between a position crossing the outer periphery of the peripheral wall and the flange portion on an extension of the rotating shaft in a radial direction from an end portion of the stator, and are constituted by a plurality of ribs.

Advantageous Effects of Invention

Accordingly, in the present invention, the plurality of ribs that connects the flange portion and the linear ribs to each other crosses each other at the outer periphery of the peripheral wall of the motor case in the section corresponding to a space between the flange portion on the output side of the rotary electric machine and the end portion of the stator, and thus, the damping ribs are formed. It is possible to reduce the torsional vibration by improving the stiffness in torsion of the rotary electric motor while promoting the weight reduction.

Details of at least one implementation of the subject matter disclosed in the present specification are set forth in the accompanying drawings and the following description. Other features, aspects, and effects of the disclosed subject matter are manifested in the following disclosures, drawings, and claims.

DESCRIPTION OF EMBODIMENTS

Hereinafter, an embodiment of the present invention will be described with reference to the drawings.

Figure 1:
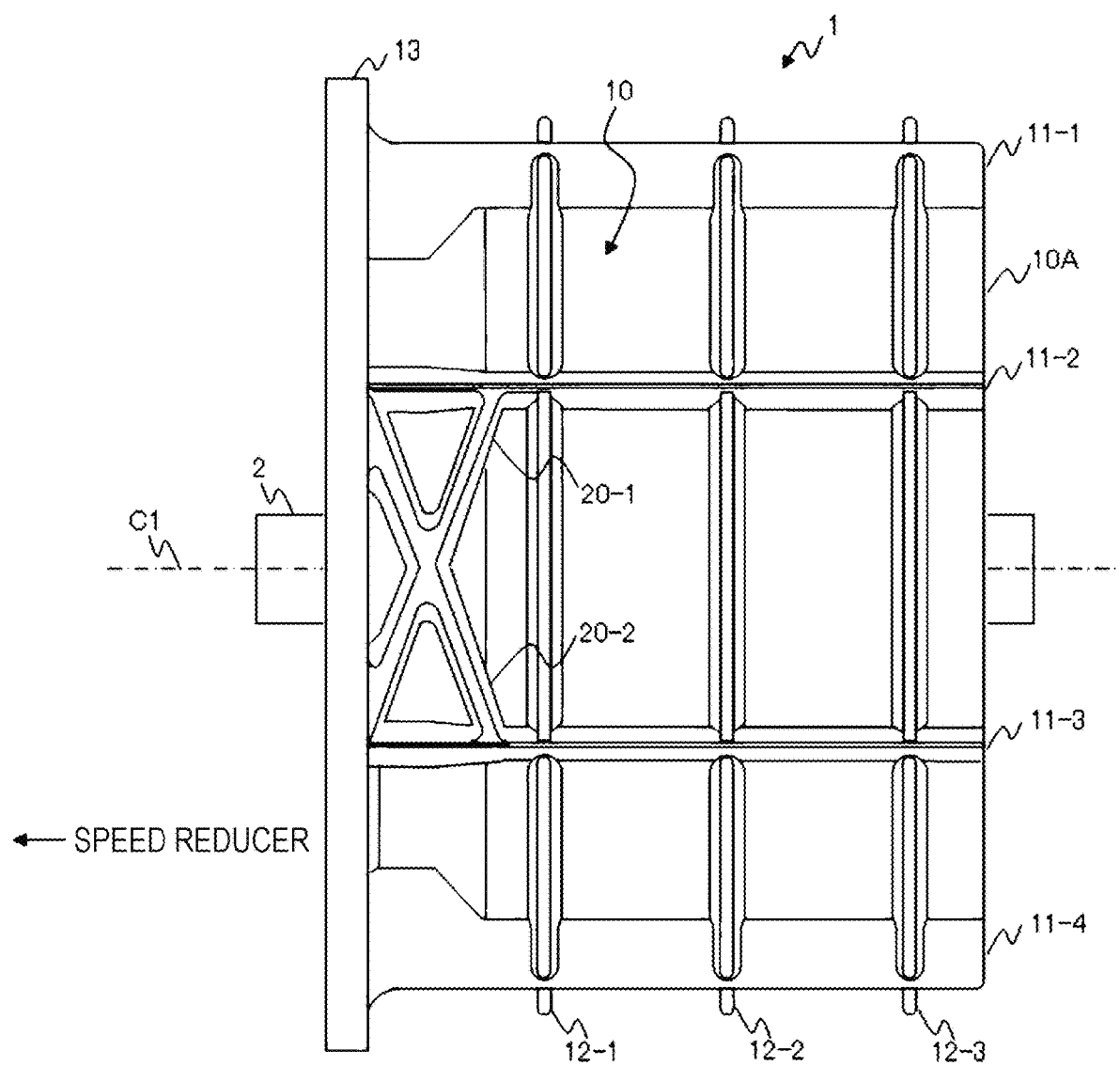
FIG. 1 shows an embodiment of the present invention and is a front view of a motor case of a rotary electric machine.

FIG. 1 shows an embodiment of the present invention and is a front view of a motor case 1 of a rotary electric machine. The motor case 1 forms a cylindrical peripheral wall 10, and a circular flange portion 13 projecting to an outer periphery is formed at an end portion of the peripheral wall 10 on a left side in the drawing.

The flange portion 13 is on an output side of the motor case 1, and has a speed reducer (or a mechanical element such as a transmission) (not shown) attached thereto. The flange portion 13 is formed at one end of the peripheral wall 10 in an axial direction, an opening end 10A is formed at the other end, and a stator, rotators (shaft 2 and a rotor), and the like are incorporated from the opening end 10A.

Linear ribs 11-1 to 11-4 parallel to an axis C1 of the shaft (rotating shaft) 2 are formed on the outer periphery of the peripheral wall 10 at predetermined intervals. The linear ribs 11-1 to 11-4 project radially from the outer periphery of the peripheral wall 10 with the axis C1 as a center at a predetermined height. In the following description, when the linear ribs are not specified, a reference sign "11" is used with "-" and subsequent parts omitted. The same applies to reference signs of other components.

Ring-shaped annular ribs 12-1 to 12-3 are formed on the outer periphery of the peripheral wall 10 at predetermined intervals in the axial direction of the axis C1. The annular ribs 12 are formed at a predetermined height from the outer periphery of the peripheral wall 10 on a plane orthogonal to the axis C1.

Damping ribs 20-1 and 20-2 in which two linear ribs cross each other are formed between the flange portion 13 and the annular rib 12-1 and between the linear rib 11-2 and the linear rib 11-3. The damping ribs 20 project at a predetermined height from the outer periphery of the peripheral wall 10.

The damping rib 20-1 (first rib) is formed at an angle larger than 0° and smaller than 90° with respect to the axis C1 direction of the shaft 2, and the damping rib 20-2 (second rib) is formed at an angle larger than 90° and smaller than 180° with respect to the axis C1 direction of the shaft 2.

The damping ribs 20-1 and 20-2 cross each other at a predetermined angle to connect the linear rib 11-2, the linear rib 11-3, and the flange portion 13 to each other.

Figure 2:
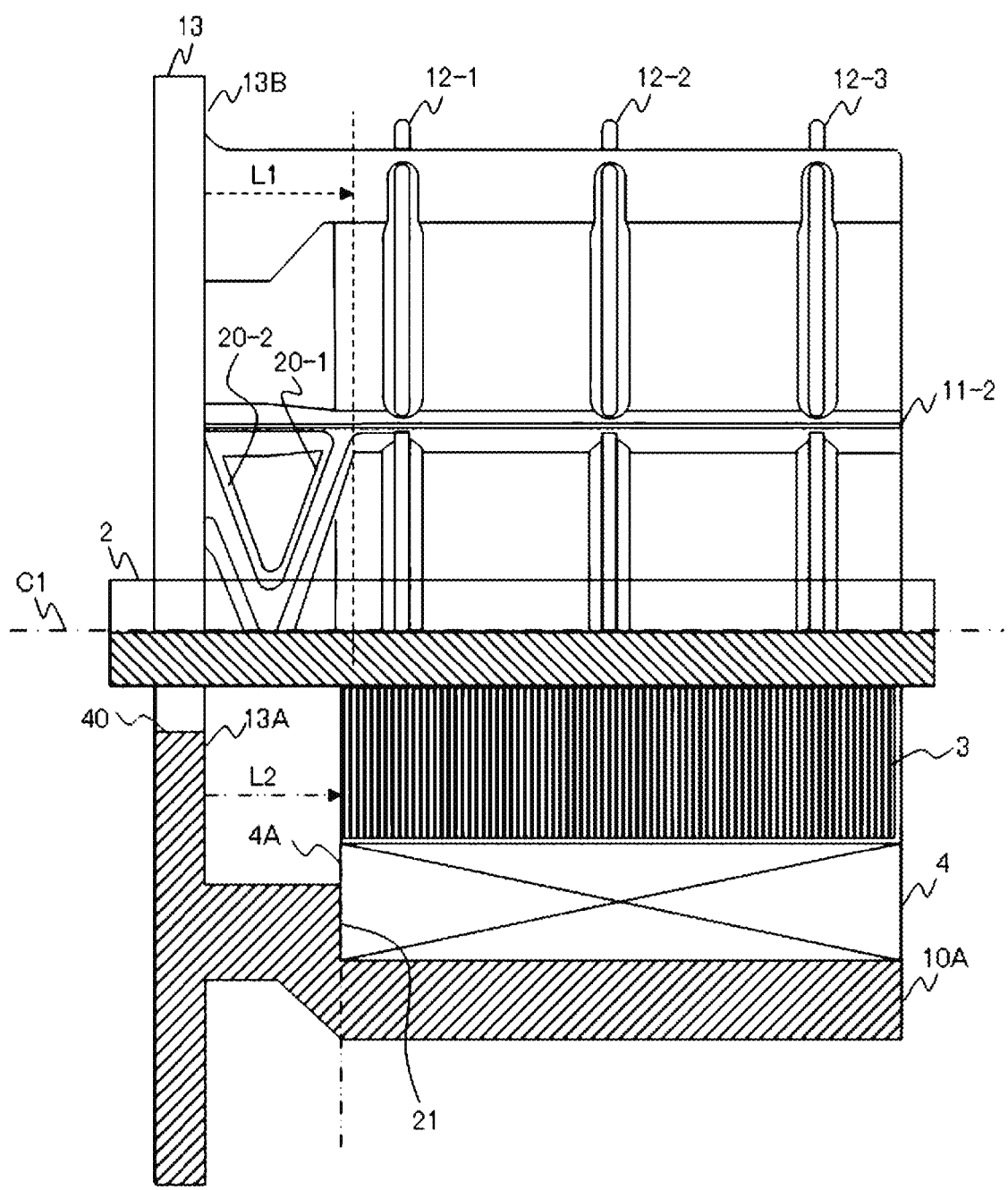
FIG. 2 shows the embodiment of the present invention and is a half sectional view of the motor case.

FIG. 2 is a half sectional view of the motor case 1 of the rotary electric machine. A through hole 40 through which the shaft 2 is inserted is formed on an inner periphery of the motor case 1 on the flange portion 13 side. A flat inner peripheral surface 13A is formed on a back side of the flange portion 13 facing the inside of the peripheral wall 10. On the inside of the peripheral wall 10 from the inner peripheral surface 13A to the opening end 10A, a columnar space is formed and the stator 4, the shaft 2, and the rotor 3 are accommodated. A bearing (not shown) is attached to the through hole 40 to rotatably support the shaft 2.

The columnar space on the inside of the peripheral wall 10 is formed by spaces having different inner diameters, and a space having a small inner diameter is formed from the inner peripheral surface 13A of the flange portion 13 to a predetermined distance L2 in the axial direction, and a space having a large inner diameter is formed from the predetermined distance L2 to the opening end 10A.

At a position of the distance L2 in the axis C1 direction from the inner peripheral surface 13A which is a boundary between the spaces having different inner diameters, a step portion 21 is formed and an end portion 4A of the stator 4 abuts. The step portion 21 functions as a wall surface for positioning the end portion 4A of the stator 4.

Next, the damping ribs 20 formed on the outer periphery of the peripheral wall 10 will be described. In the present embodiment, positions of an outer peripheral surface 13B of the flange portion 13 on the opening end 10A side which is connected to the outer periphery of the peripheral wall 10 and the inner peripheral surface 13A on the inside of the peripheral wall 10 in the axis C1 direction are the same. The outer peripheral surface 13B of the flange portion 13 is formed by a plane rising from the outer periphery of the peripheral wall 10.

An end portion of the damping rib 20-1 on the flange portion 13 side is connected to the linear rib 11-3 (see FIG. 1) and is inclined at a predetermined angle with respect to the axis C1, and the other end is connected to the linear rib 11-2. A position of the damping rib 20-1 connected to the linear rib 11-2 in the axis C1 direction is set to a predetermined distance L1 from the outer peripheral surface 13B of the flange portion 13.

Similarly, an end portion of the damping rib 20-2 on the flange portion 13 side is connected to the linear rib 11-2 and is inclined at a predetermined angle with respect to the axis C1, and the other end is connected to the linear rib 11-3 (see FIG. 1). A position of the damping rib 20-2 connected to the linear rib 11-3 in the axis C1 direction is set to the predetermined distance L1 from the outer peripheral surface 13B of the flange portion 13.

The damping ribs 20-1 and 20-2 are connected to the linear ribs 11 at a position of L1 at which the positions of the damping ribs connected to the linear ribs are the same in the axis C1 direction. The distance L1 from the outer peripheral surface 13B of the flange portion 13 is set to be larger than the distance L2 from the inner peripheral surface 13A on which the end portion 4A (step portion 21) of the stator 4 is disposed.

Here, an electromagnetic excitation force of the rotary electric machine is generated between the rotor 3 and the stator 4. The electromagnetic excitation force is transmitted to the motor case 1 via the stator 4.

The motor case 1 of the present embodiment is to determine the arrangement of the damping ribs 20 by paying attention to the electromagnetic excitation force generated by the stator 4. That is, the damping ribs 20 are arranged so as to partially cover the outer periphery of the peripheral wall 10 in a section (distance L2) in the axis C1 direction corresponding to a space from the flange portion 13 that couples the rotary electric machine to the speed reducer to the end portion 4A of the stator 4 that generates the electromagnetic excitation force.

In the present embodiment, an X-shaped damping ribs 20 in which two linear ribs cross each other are formed from the outer peripheral surface 13B on the outer peripheral side of the peripheral wall 10 to the distance L1, and the end portion 4A of the stator 4 on the inside of the peripheral wall 10 is covered.

That is, a position in the axis C1 direction at which the damping ribs 20 are formed is the distance L1 larger than the distance L2 from the inner peripheral surface 13A of the flange portion 13 to the end portion 4A of the stator 4. In other words, the outer periphery of the peripheral wall 10 of which the positions in the axis C1 direction coincide with each other in a radial direction from the end portion 4A of the stator 4 is covered with the damping ribs 20.

Here, when the peripheral wall 10 is manufactured by casting, the damping ribs 20 are intermittently arranged in a circumferential direction of the peripheral wall 10 among the linear ribs 11 in consideration of the casting. Although an example in which since the motor case 1 is manufactured by casting, the damping ribs 20 connected to the flange portion 13 are formed between the linear ribs 11-2 and 11-3 and the damping ribs 20 are not formed between the linear ribs 11-1 and 11-2 is illustrated in the present embodiment, the present invention is not limited thereto. For example, when the motor case 1 is manufactured by cutting, it is possible to form the damping ribs 20 on the entire circumference between the adjacent linear ribs 11.

Figure 3:
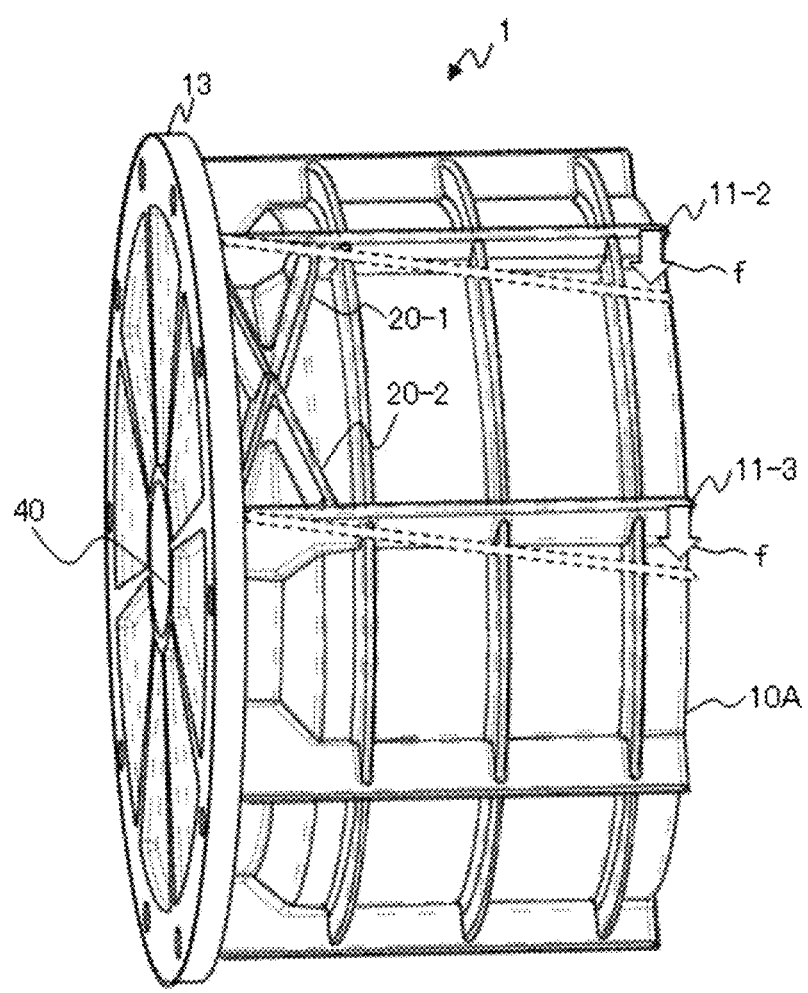
FIG. 3 shows the embodiment of the present invention and is a perspective view of the motor case.

FIG. 3 is a perspective view of the motor case 1 of the rotary electric machine. FIG. 3 shows a scene in which the linear ribs 11 of the motor case 1 are deformed by an electromagnetic excitation force f. When the flange portion 13 of the motor case 1 is coupled to the speed reducer that transmits an output of the rotary electric machine and the rotators (rotor 3 and shaft 2) generates a torque, the electromagnetic excitation force f is generated.

The electromagnetic excitation force f acts so as to twist the linear ribs 11 downward in the drawing on the opening end 10A side as shown by an arrow in the drawing. In this case, the damping rib 20-1 suppresses the deformation of the linear rib 11-2 by supporting the linear rib 11-2 being twisted downward by a force in a compression direction at the end portion on the flange portion 13 side. On the other hand, the damping rib 20-2 suppresses the deformation of the linear rib 11-3 by supporting the linear rib 11-3 being twisted downward by a force in a tensile direction at the end portion on the flange portion 13 side.

As stated above, the X-shaped damping ribs 20 that connect the linear ribs 11 and the flange portion 13 to each other are formed in the section corresponding to a space from the flange portion 13 to the end portion 4A of the stator 4 at the outer periphery of the peripheral wall 10, and thus, it is possible to promote weight reduction while improving torsional stiffness of the motor case 1.

As described above, in the present embodiment, the two ribs which connect the flange portion 13 and the linear ribs 11-2 and 11-3 to each other cross each other, and thus, the damping ribs 20 are formed. Accordingly, the position at which the damping ribs 20 are formed is the outer periphery of the peripheral wall 10 that covers from the flange portion 13 to the end portion 4A of the stator 4.

In other words, the damping ribs 20 that support the linear ribs 11 by the plurality of ribs are formed between a position crossing the peripheral wall 10 and the outer peripheral surface 13B of the flange portion 13 on an extension of the shaft 2 in the radial direction from the end portion 4A of the stator 4.

Accordingly, it is possible to improve the torsional stiffness while suppressing an increase in a weight of the motor case 1. Accordingly, vibration due to the electromagnetic excitation force is reduced, and thus, it is possible to improve quietness of a vehicle having the rotary electric machine mounted thereon.

Although the position of the damping ribs 20 is described with the axis C1 of the shaft 2 as a reference in the above embodiment, the axis of the peripheral wall 10 may be used as the reference.

Although an example in which the step portion 21 for positioning the stator 4 in the axial direction is formed on the inside of the peripheral wall 10 is illustrated in the above embodiment, the present invention is not limited thereto. For example, the inside of the peripheral wall 10 may be a space having a single inner diameter, and a spacer or the like may be inserted on the inner peripheral surface 13A side.

Although an example in which the shape of the peripheral wall 10 is the cylindrical shape is illustrated in the above embodiment, a tubular shape that can accommodate the stator 4 and the rotators (shaft 2 and rotor 3) only has to be used.

Although an example in which the linear rib 11 parallel to the axis C1 direction is formed on the outer periphery of the peripheral wall 10 is illustrated in the above embodiment, the present invention is not limited thereto. The ribs in the axis C1 direction may not be provided on the outer periphery of the peripheral wall 10. Ribs inclined with respect to the axis C1 may be provided on the outer periphery of the peripheral wall 10.

CONCLUSION

As described above, the motor case 1 according to the embodiment is the motor case that accommodates the stator (4), the rotor (3) facing the inner periphery of the stator (4), the rotating shaft (2) coupled to the rotor (3), and the stator (4) and the rotating shaft (2). The motor case includes the peripheral wall (10) which is formed in the tubular shape and has the space accommodating the stator (4) and the rotating shaft (2) on the inside, the flange portion (13) which is formed at one end of the peripheral wall (10) and is coupled to the outside, and the damping ribs (20) which are formed at the outer periphery of the peripheral wall (10), are formed between the position crossing the outer periphery of the peripheral wall (10) and the flange portion (13) on the extension of the rotating shaft (2) in the radial direction from the end portion of the stator (4), and are constituted by the plurality of ribs.

The damping ribs 20 in which the plurality of ribs (20-1 and 20-2) are combined in the section corresponding to a space from the flange portion 13 to the end portion 4A of the stator 4 at the outer periphery of the peripheral wall 10 of the motor case 1 are formed, and thus, it is possible to promote the weight reduction while improving the torsional stiffness of the motor case 1.

The damping ribs (20) are obtained by the plurality of linear ribs (20-1 and 20-2) crossing each other. Accordingly, when the electromagnetic excitation force is applied to the peripheral wall 10, for example, the damping rib 20-1 supports the force in the compression direction while the damping rib 20-2 supports the force in the tensile direction. The damping ribs 20 suppress torsional vibration, and thus, it is possible to improve the torsional stiffness of the peripheral wall 10 from the outer periphery of the end portion 4A of the stator 4 in the radial direction to the flange portion 13. Since the weight of the plurality of linear ribs (20-1 and 20-2) is light, it is possible to suppress an excessive increase in the weight of the motor case 1.

The linear ribs parallel to the axial direction of the rotating shaft (2) are formed at the outer periphery of the peripheral wall (10), and the damping ribs (20) connect the linear ribs and the flange portion (13) to each other.

Accordingly, when the electromagnetic excitation force is applied to the peripheral wall 10, for example, the damping rib 20-1 suppresses the deformation of the linear rib 11-2 by supporting the linear rib 11-2 being twisted downward by the force in the compression direction at the end portion on the flange portion 13 side. On the other hand, the damping rib 20-2 suppresses the deformation of the linear rib 11-3 by supporting the linear rib 11-3 being twisted downward by a force in a tensile direction at the end portion on the flange portion 13 side. As stated above, the damping ribs 20 can suppress the torsional vibration, and thus, it is possible to improve the torsional stiffness of the peripheral wall 10 from the outer periphery of the end portion 4A of the stator 4 in the radial direction to the flange portion 13.

The plurality of ribs includes the first rib and the second rib, the first rib is formed at an angle larger than 0° and smaller than 90° with respect to the axial direction of the rotating shaft (2), and the second rib is formed at an angle larger than 90° and smaller than 180° with respect to the axial direction of the rotating shaft (2).

Accordingly, the X-shaped damping ribs 20 that connect the linear ribs 11 and the flange portion 13 to each other are formed in the section corresponding to a space from the flange portion 13 to the end portion 4A of the stator 4 at the outer periphery of the peripheral wall 10, and thus, it is possible to promote the weight reduction while improving the torsional stiffness of the motor case 1.

The damping rib 20-1 and the damping rib 20-2 cross each other, and thus, when the damping rib 20-1 receives a compressive load and the damping rib 20-2 receives a tensile load, the deformation due to the tension of the damping rib 20-2 is reduced by distributing the loads from the position crossing the damping rib 20-1. Accordingly, the torsional vibration can be reduced.

The present invention is not limited to the aforementioned embodiments, and includes various modification examples. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. Any of addition, deletion, and replacement of other components to, from, and with some of the components of each embodiment can be applied alone or in combination.

REFERENCE SIGNS LIST 1 motor case
2 shaft
3 rotor
4 stator
4A end portion
1 peripheral wall
11-1 to 11-4 rib in axial direction
12-1 to 12-3 rib in circumferential direction 13 flange portion
13A inner peripheral surface
20-1,20-2 damping rib
21 step portion

The invention claimed is:

1. A motor case that accommodates a stator, a rotor facing an inner periphery of the stator, and a rotating shaft coupled to the rotor, the motor case comprising:
   a peripheral wall which is formed in a tubular shape and has a space accommodating the stator and the rotating shaft on an inside;
   a flange portion which is formed at one end of the peripheral wall and is coupled to an outside;
   damping ribs which are formed at an outer periphery of the peripheral wall, are formed between (i) a position crossing the outer periphery of the peripheral wall and (ii) the flange portion on an extension of the rotating shaft in a radial direction from an end portion of the stator; and
   at least two linear ribs which are formed on the outer periphery of the peripheral wall in a direction parallel to an axial direction of the rotating shaft,
   wherein the damping ribs (i) are formed between the at least two linear ribs, (ii) cross each other, and (iii) connect the linear ribs and the flange portion to each other.

2. The motor case according to claim 1,
   wherein the damping ribs include a first rib and a second rib, the first rib is formed at an angle larger than 0° and smaller than 90° with respect to the axial direction of the rotating shaft, and the second rib is formed at an angle larger than 90° and smaller than 180° with respect to the axial direction of the rotating shaft.

* * * * *